July 21, 1970 G. ROHLF 3,521,336
GUIDE ASSEMBLAGE FOR SLIDING SHUTTERING FOR BUILDING
CONCRETE STRUCTURES
Filed Aug. 7, 1968 7 Sheets-Sheet 7

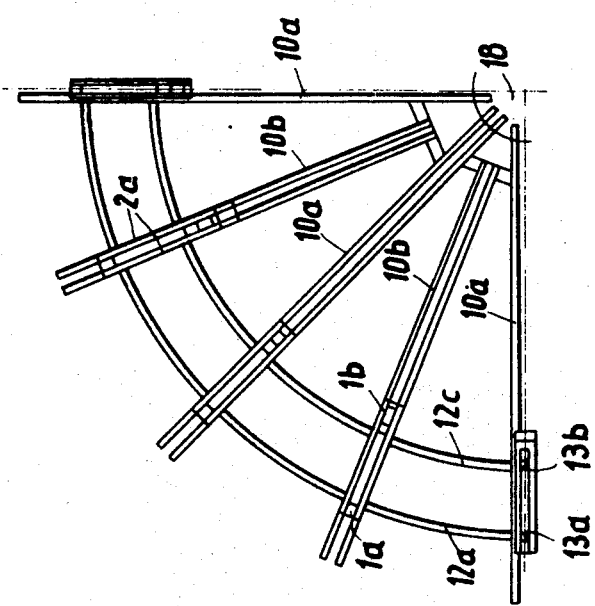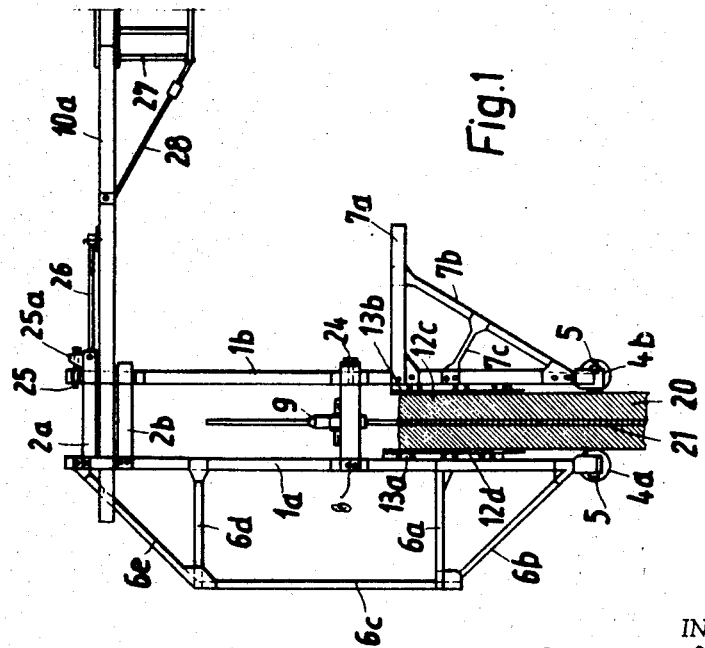

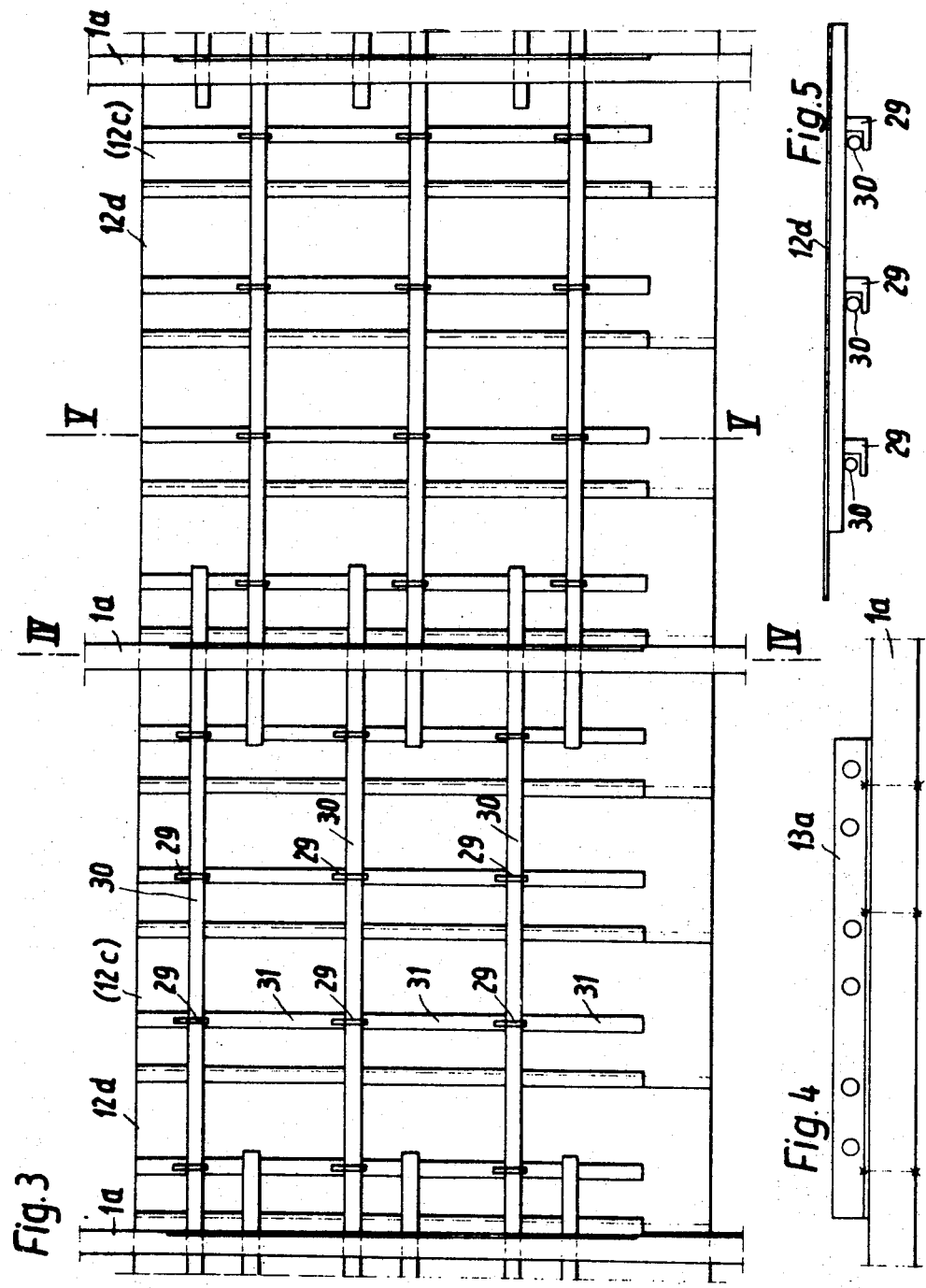

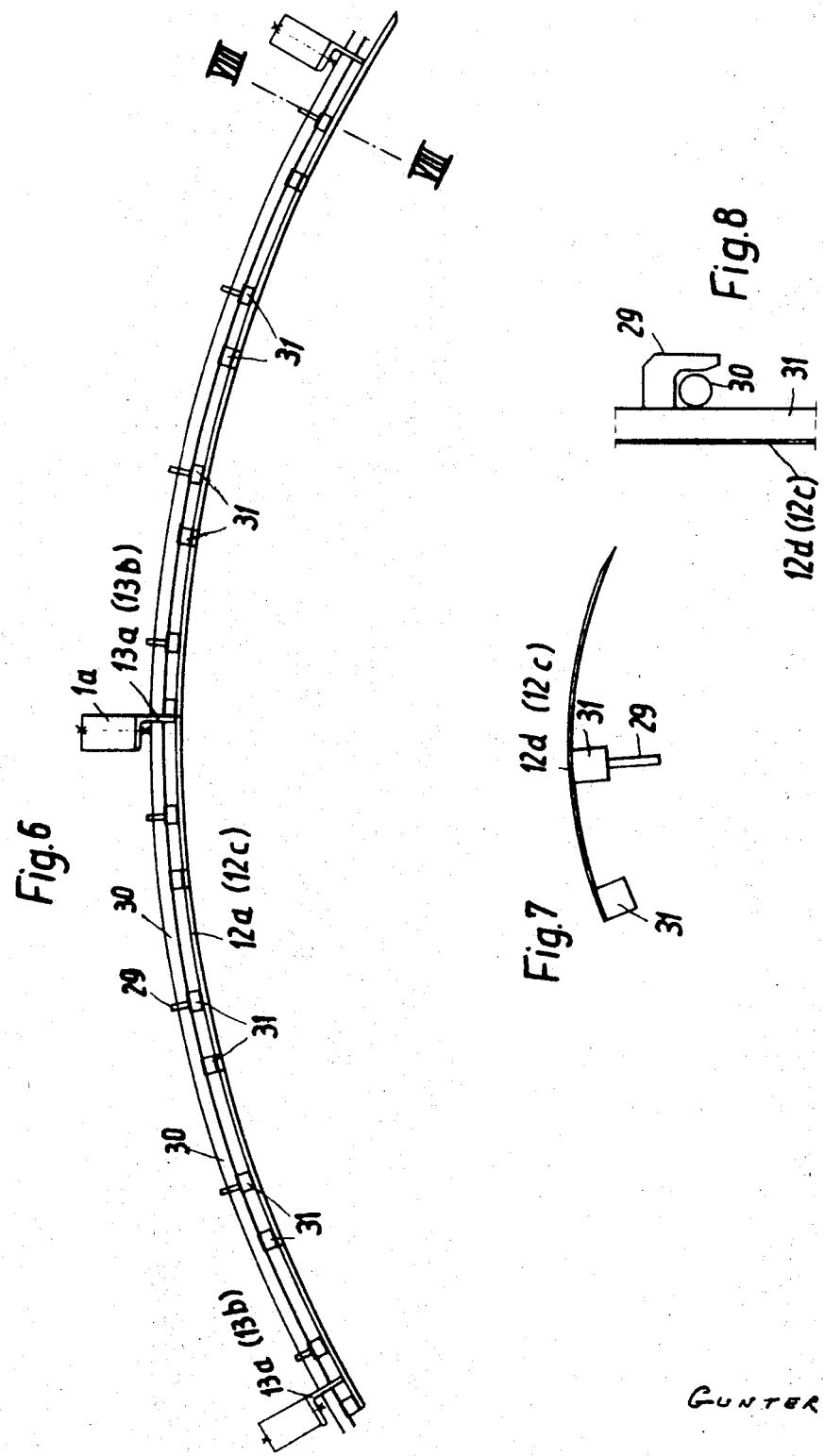

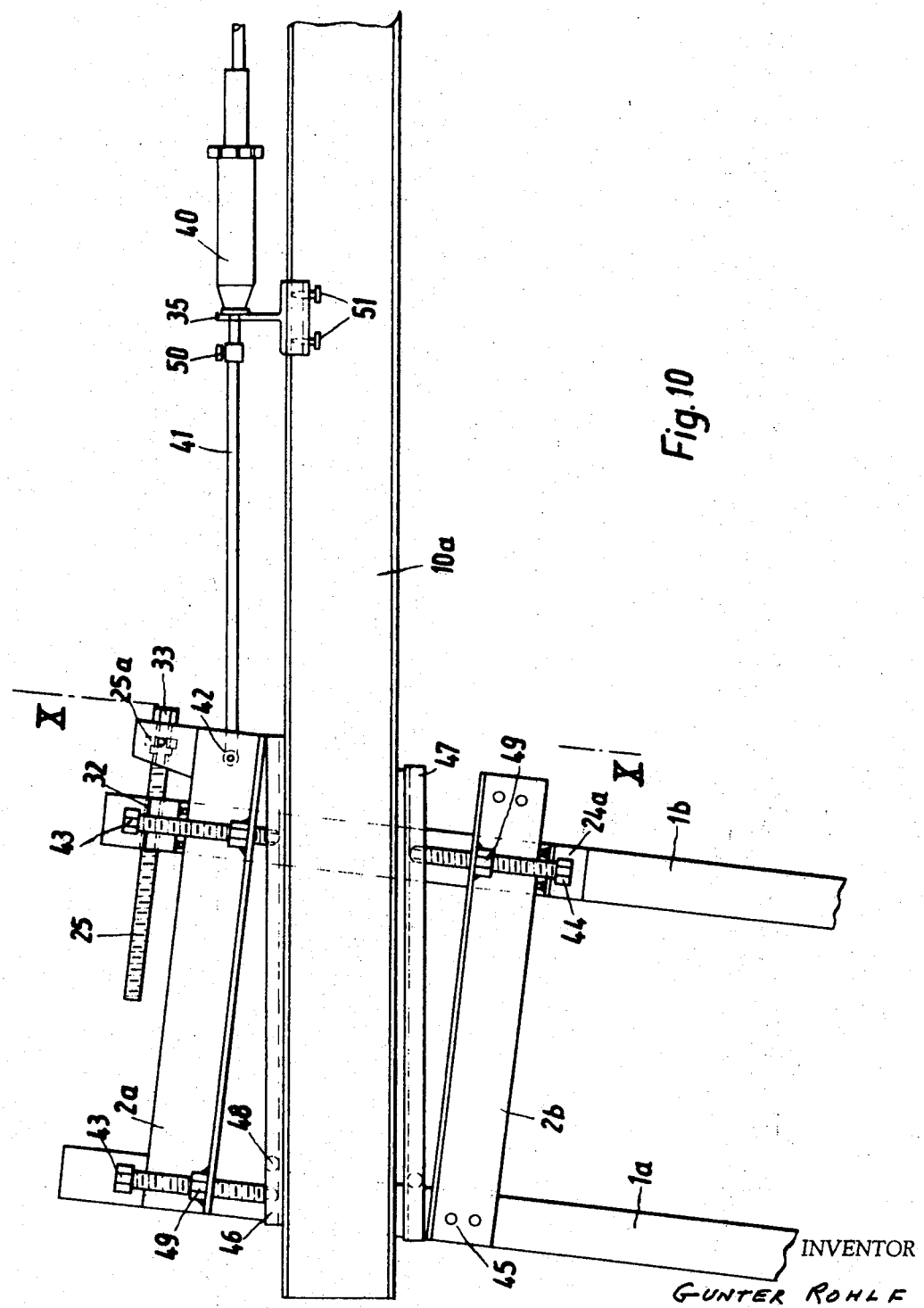

(X-X)

(IXa-IXb)

(IXc-IXd)

INVENTOR
GUNTER ROHLF

BY Glascock, Downing & Seebold

ATTORNEYS

United States Patent Office 3,521,336
Patented July 21, 1970

3,521,336
GUIDE ASSEMBLAGE FOR SLIDING SHUTTERING FOR BUILDING CONCRETE STRUCTURES
Gunter Rohlf, Dusseldorf, Germany, assignor to Gleitschnellbau Gesellschaft mit beschrankter Haftung, Dusseldorf, Germany
Continuation-in-part of application Ser. No. 473,773, July 25, 1965. This application Aug. 7, 1968, Ser. No. 750,897
Claims priority, application Germany, Apr. 10, 1965, 1,534,944
Int. Cl. B28b 7/02
U.S. Cl. 25—131　　　　　　　　　　　　　　　5 Claims

ABSTRACT OF THE DISCLOSURE

A guide assemblage for sliding shuttering for building concrete structures including mechanical or hydraulic lifting means in which the shuttering plates are horizontally displaceable at the margin of a horizontally mounted grid. The guide members are defined by substantially parallel limbs on the inner facing sides of which the shuttering plates are fixed with the limbs overlapping an area in front of the grid as far as the area of the hardened concrete present below the plates. The guide members are supported at the lower ends thereof against the concrete by sliders and the members are jointly displaceable in relation to the grid and with one of the guide members being displaceable with respect to the other guide member.

---

Figure 6A:
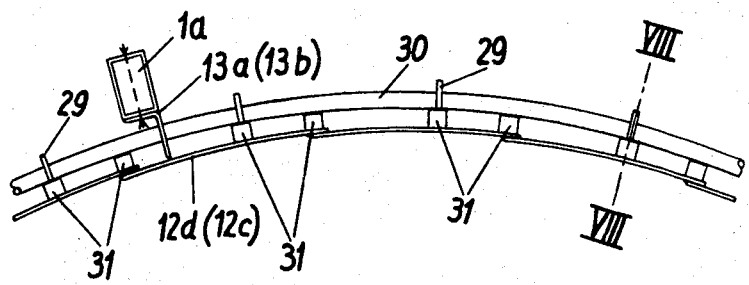

This application is a continuation-in-part of my copending application, Ser. No. 473,773, filed July 25, 1965, and entitled "Guiding Means for Slidable Shuttering," now abandoned.

The present invention relates to sliding framework for building structures of the type in which guide members for shuttering plates are arranged to be horizontally displaceable on the margin of a horizontally supported grid with the guide members including parallel or substantially parallel limbs or uprights to the inner facing sides of which the shuttering plates are secured.

The limbs thus engage over an area of the grid in the region of reinforced concrete located beneath the plates and abut against the concrete at their lower ends by means of sliders.

Optional means can be utilized for guiding the slidable framework for permitting the plates to be quickly displaced relative to each other for adjusting the apparatus not only to various wall thicknesses but also to obtain continuously decreasing or increasing wall thicknesses. Moreover, such means allow the adaptation of the concrete wall to rapidly and elastically determine stresses as a result of which not only is the handling of the framework facilitated but an improvement is effected in the economical dimensioning of the construction.

Generally, the invention includes at least one of the limbs or uprights of the guide members being adjustably constructed and in a preferred embodiment, this is accomplished by arranging one of the limbs to be displaceably disposed between pairs of transverse girders and at least two adjusting devices arranged in the upper and middle portion of the limb function for displacing the limb between the guides. By virtue of the use of at least two displacement devices, the displaceable limb can be moved not only parallel to the other limb but can be adjusted in substantially any desired oblique position. The stability of the guiding devices for the plates can optionally be maintained during the constructional procedure by providing one of the limbs with a truss stiffening arrangement for insuring linearity in the displacement of the shuttering plates.

A further important aspect of the invention is that the radial girders of the horizontal grid on the outer ends of which the guide for the slidable shuttering is suspended, is connected by a center support and tension members. By reason of this stiffening aspect which is realized with a slight outlay of material the stability and resistance of the grid to deformation is increased which means that the guiding of the shuttering plates is even more accurate.

A further important feature of the invention is that the skin of the shuttering consists of laminated panels of high grade steel which are pre-bent against the wall curvature and with the lamellae of the skin in the installed condition being pre-stressed as well as the lamella being provided with hooks opening downwardly and tube elements on which the lamella may be suspended by the hooks and which tube elements are laterally displaceable. Upon concreting and particularly upon the ramming of fresh concrete, no grout can be forced out at the overlapping joints of the separate lamella and due to the pretensioning, the curvature of the skin is quite even.

Still another important aspect of the invention is that it is possible with the same guide framework to suspend optionally shuttering plates of various thicknesses which becomes necessary when concrete walls of great thickness are to be concreted as their horizontal shear effect becomes at times considerably greater with increasing thickness.

Figure 3A:
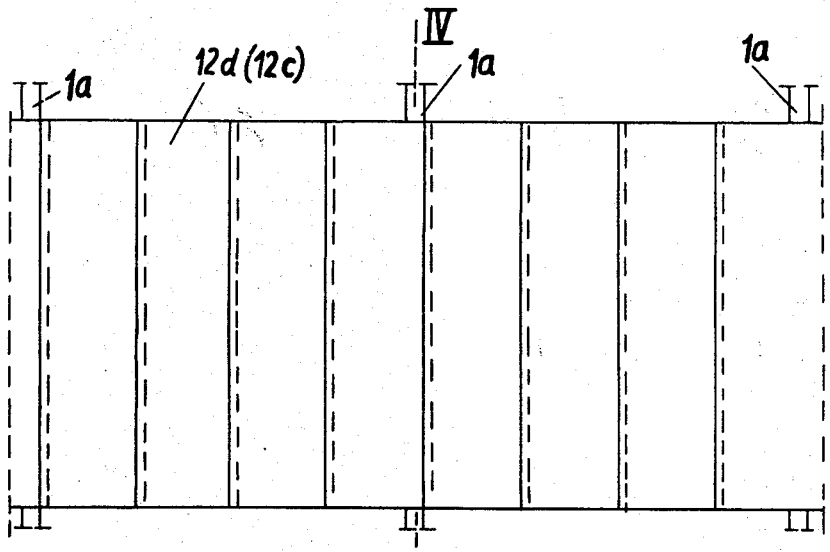
Figure 9:
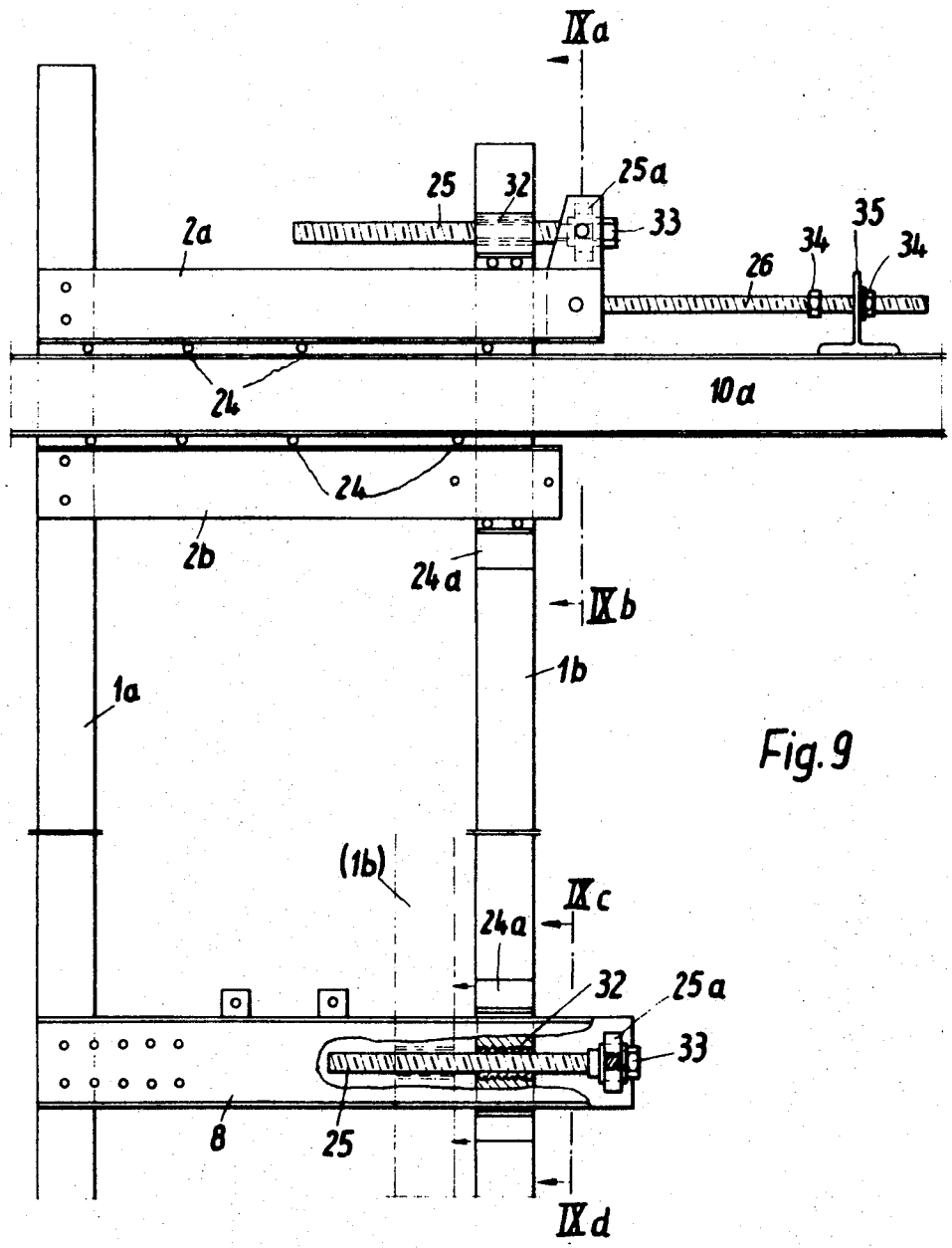
Figure 13:
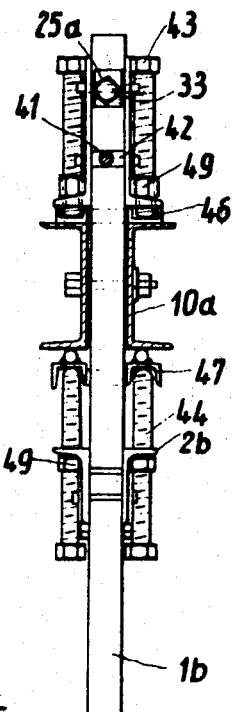
Figure 11:
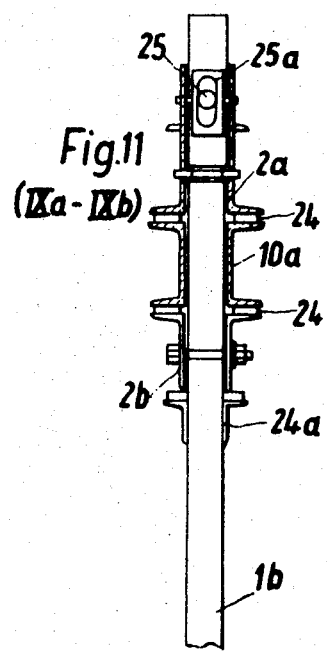
Figure 12:
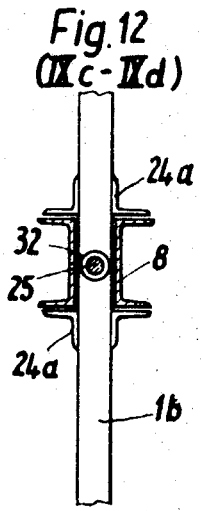

Further objects and advantages of the invention will become more readily apparent from the following detailed description and annexed drawings and in which drawings:

FIG. 1 is a side elevational view of a guide assemblage in which a part of the already finished concrete wall is illustrated in cross section;

FIG. 2 is a plan view of the horizontally arranged grid defined by a segment of a sector, FIG. 3 is a front elevational view of a shuttering plate illustrating generally the position of a perpendicular stiffening girder provided with hooks and horizontal tube girders, FIG. 3a is a view generally similar to FIG. 3 illustrating the manner in which the lamellae are pushed laterally over one another, FIG. 4 is a view taken along the line IV—IV of FIG. 3, FIG. 5 is a view taken along the line V—V of FIG. 3, FIG. 6 is a view in horizontal section taken through a shuttering plate provided with stiffeners and hooks, FIG. 6a is a view generally similar to FIG. 6 illustrating the surfaces of the shutterings plates which are pushed over one another, FIG. 7 is a horizontal part sectional view taken through a pre-bent lamella, FIG. 8 is a view taken along VIII—VIII of FIG. 6, FIG. 9 is a side view of the adjusting means for the limb, the view being on an enlarged scale, FIG. 10 is a side view of a variation of the arrangement illustrated in FIG. 9, FIG. 11 is a view taken along line IXA–IXB of FIG. 9, with a view of the part of the device in FIG. 9 located to the left of the section line, FIG. 12 is a view taken along line IXC–IXD of FIG. 9 in the direction of viewing in FIG. 11, and FIG. 13 is a view taken along X—X of FIG. 10 with a view of the part located to the left of the section line.

While hydraulic lifting appliances are employed with the assemblage for guiding a slidable shuttering illustrated in FIG. 1, it is of course possible to replace such hydraulic appliances with mechanically operated appliances. The assemblage as an entity is supported upon a ferroconcrete unit 20 cast in local shuttering and which in this embodiment should be approximately 1.50 m. in height. As an alternative, the shuttering can be mounted directly on the base or a base type sub-structure in such a manner that rollers rest on the concrete. The interstices between the upper edge of the base and the under edge of the shuttering plates or sheets can be bridged temporarily that is to say for the period of the beginning of the concreting operation, with an ordinary stay shuttering of iron plates, and the plates are removed as soon as the slidable shuttering has reached one or two meters in height and the rollers have run thereover.

As illustrated in FIG. 1, a guide assemblage G for shuttering plates 12c and 12d is defined by limbs or uprights 1a and 1b. It will be seen that at approximately the mid-point of the limbs a transverse girder connects the limbs so as to be reciprocably displaceable. Transverse girders 2a and 2b are disposed between the limbs 1a and 1b at the top thereof for allowing a relative displacement of the limbs. The distance between the limbs 1a and 1b and their position relative to each other is ascertained from the thickness of the concrete wall to be produced and optionally from the decrease or increase in the wall thickness. The girder 8 serves as a yoke which is fixedly connected with a lifting unit 9 adapted to be supplied with oil under pressure and which lifting unit is carried at the upper part of a jack rod 21. The entire guiding assemblage is held at a grid in which single girders 10a and 10b extend in a radial direction. The radial girders 10a and 10b are connected by a center support 27 and tension rods 28. It will be noted that the limb 1a is stiffened by a truss arrangement including rods 6a–6e and the rod 6a can support an external working platform. In lieu of this particular truss arrangement a solid wall construction may be employed either in whole or in part. At the lower end of the other limb 1b a truss arrangement 7a–7c is provided and which serves to support a working platform. Rollers 4a and 4b are carried by the lower ends of the limbs 1a and 1b respectively and these rollers are adjustable to a definite thickness of the unit 20 by manipulation of set screws 5.

FIG. 2 illustrates in detail the structural features of the horizontal grid and the radially arranged girders 10a and 10b are stiffened by transverse girders and terminate at the center support 27 (see FIG. 1).

The plates 12d and 12c illustrated in FIG. 1 are stiffened by vertical girders 31 having hooks 29 as perhaps more clearly illustrated in FIGS. 7 and 8. The plates are suspended on precurved horizontal tube elements 30 by means of the hooks 29 and which elements are inserted through perpendicularly arranged girders 13a and 13b (FIGS. 3 and 6). The girders 13a and 13b are attached to the limbs 1a and 1b.

The skin of the shuttering includes sheet panels arranged in laminated form and which are substantially greater in height than in width so that high rectangular areas occur. The lamellae are in each situation stiffened by two welded tubular elements 31 (FIG. 6) and the lamella elements overlap each other at their free side edges so that the lamellae are laterally displaceable on the elements 30. Since the same are suspended by means of the hooks 29, they can also be pushed outwardly and removed during the concreting operation. In order to enable the separate lamellae of the skin to fully fit the curvature of the concrete wall the lamellae are manufactured of high-grade steel and pre-bent against the wall curvature. By this construction, the entire skin of the shuttering in the finished assembled state is resiliently tensioned whereby (FIG. 7), during the concreting operation, and particularly during the ramming of the fresh concrete no grout can be forced out at the overlapping locations of the separate lamella.

It is beieved that FIGS. 3a and 6a clearly illustrate the arrangement of the lamellae which are pushed laterally over one another and which constitute the casing in the surfaces of the shuttering plates which are pushed over one another.

FIG. 9 illustrates the details of the means serving for the displacement of the limb 1b relative to the limb 1a. A shaft 26 is inserted through an opening in a counterbearing 27 disposed on the radial girder 10a. By turning an adjusting nut 28 the relative position of the girder 10a and the limbs 1a and 1b in common with the transverse girders 2a and 2b can be changed. In order to reduce friction, transversely disposed round iron bars are welded onto the girders 2a and 2b for reducing the friction between the girders 2a and 2b and the radial girders 10a and 10b. When this adjustment occurs, the limbs 1a and 1b can execute a pivotal movement about the rollers 4a and 4b. The limb 1a is displaceably carried between the transverse girders 2a, 2b and 8 in order that the limb 1b can additionally effect a radial movement in the direction of the girder 10a and relative to the limb 1a.

At the upper end of the limb 1a, the adjustment includes a screw threaded bushing 32 which is inserted in the limb 1b. A screw rod 25 is located in the bushing 32 and is inserted on the right side thereof through an end bearing 25a attached to the right-hand end of the transverse girder 2a. By turning head 33 provided on the rod 25, the relative position of the limb 1a and the limb 1b can be changed.

A second adjustment means is located on the transverse girder 8 and includes a screw threaded bushing 32 inserted in the limb 1b and a screw rod 25 is inserted through the bushing 32. At the right-hand end, the screw rod 25 is inserted through an end bearing 25a attached to the transverse girder 8. The adjustment is effected in the manner as above mentioned by turning head 33 on the end of rod 25. In order to clearly define the action, the adjusted limb 1b is shown on the left in dot-dash lines. By reason of the above adjustment means it is not only possible to change the position of the limbs 1a and 1b in common relative to the radial girder 10a but to adjust the limb 1b with respect to the limb 1a and selectively either parallel to the limb 1a or by a pivotal adjustment with the rod heads adjusted upwardly and downwardly to a differing degree.

In FIG. 10 there is disclosed a variation of the adjusting means in which a horizontally operable oil pressure piston cylinder unit 40 is mounted on the radial girder 10a by means of a suitable support 35 detachably connected to the girder by screws or the like 51. Horizontal piston rod 41 of the piston cylinder unit 40 engages the end of the transverse girder 2a beneath the end bearing 25a by means of a length 42. By virtue of this particular arrangement, the entire yoke construction can be moved to and fro via control of the oil pressure in the radial direction in relation to the axis of symmetry of the structure thereby greatly facilitating the adjustment. By virtue of member 50 on the piston rod 41, the relative position of the radial grider 10a and limbs 1a and 1b in common with the girders 2a and 2b can be altered.

In this embodiment, adjustable slide skids 46 and 47 are positioned on the transverse girders 2a and 2b. The upper skid 46 can be adjusted by means of a screw 43 and skid 47 is pivotally connected at 45 and adjustable at the other side by screws 44. The adjusting screws 43 and 44 are each inserted through a screw threaded element 49 welded to the horizontal flange of the transverse girders 2a and 2b. To reduce friction between the radial girders 10a and 10b and the skids 46 and 47, transversely arranged round iron pieces 48 are welded between the skids. This arrangement is particularly efficacious in those situations in which the wall of the structure does not narrow continuously but follows any curve desired. The adjustable skids 46 and 47 permit the adapting and guiding of the radial girders 10a and 10b to follow the changing inclination or adapting the radial girders precisely to the changing inclination of the limbs 1a and 1b. For example, it would be possible to control in common the oil pressure for the piston cylinder unit 40 centrally as a function of a prescribed curved incline of the structure. Manifestly, the adjustment becomes even more precise and the servicing is facilitated substantially.

FIG. 11 indicates the position of the various girders with respect to the limb 1b. It will be noted that on both sides of the limb 1b there is provided a radial girder 10a which in this embodiment is a U-shaped profile. Above the radial girders 1a can be seen the transversely disposed round iron bars 24 and above and underneath the bars 24 the transverse girders 2a and 2b. Lastly, angle irons 24a are positioned at the lower end. In the upper part can be seen the rod 25 which is inserted through the end bearing 25a and an elongated slot in the end bearing 25a permits a vertical adjustment.

In FIG. 12 is illustrated the arrangement of the profiles in relation to the limb 1b and it will be noted that the screw threaded bushing 32 is installed in the limb 1b which guides the rod 25. On both sides of the limb 1b, the transverse girder 8 is positioned and above and below the girder 8 the angle irons 24a.

FIG. 13 shows that the radial girders 10a are disposed on both sides of the limb 1b and the upper adjustment screws 43 and the lower adjustment screws 44 are clearly discernible. The piston rod 41 which engages the link 42 and the upper and lower skids 46 and 47 are clearly visible.

This invention is not to be confined to any strict conformity to the showings in the drawings but changes or modifications may be made therein so long as such changes or modifications mark no material departure from the spirit and scope of the appended claims.

What I claim is:

1. A guide assemblage for sliding shuttering for building concrete structures and particularly structures having slightly sloping and ring-shaped walls and provided with lifting means therefor, comprising at least two spaced guide members, a shuttering plate member secured to the inner side of each guide member with the shuttering plate members facing one another, a horizontally mounted grid, said guide members being horizontally displaceable with respect to the margin of said grid, said guide members overlapping an area in front of the grid as far as the area of the hardened concrete present below the shuttering plate members, a slider at the lower end of each guide member by which the lower ends of the guide members are supported against the concrete, means for mounting the guide members for pivotal movement in common in relation to the grid, and means for displacing one guide member relatively to the other guide member.

2. A guide assemblage for sliding shuttering for building concrete structure and particularly structures having a slightly sloping and ring-shaped walls and provided with lifting means therefor, comprising at least two spaced guide members, a shuttering plate member secured to the inner side of each guide member with the shuttering plate members facing one another, a horizontally mounted grid, said guide members being horizontally displaceable with respect to the margin of said grid, said guide members overlapping an area in front of the grid as far as the area of the hardened concrete present below the shuttering plate members, a slider at the lower end of each guide member by which the lower ends of the guide members are supported against the concrete, means for displacing the guide members jointly in relation to the horizontally mounted grid, means for displacing one guide member relative to the other guide member, the other guide member being carried between transverse girders to be displaceable in the radial direction, an adjustment device disposed on one side between a radial girder and a transverse girder, and two adjustment devices provided in the upper and middle part of said one guide member whereby the relative position of said one guide member is adjustable relative to the other guide member.

3. The guide assemblage as claimed in claim 2 in which the radial girders terminate in a center support and are connected by tension rods which are subsequently tensionable.

4. The guide assemblage as claimed in claim 2 in which slide skids are adjustably disposed on the transverse girders which can be pressed thereagainst in the oblique position of the guide members.

5. The guide assemblage as claimed in claim 4 in which an oil pressure lever is arranged, which engages in an articulation via a jack-rod on the transverse girder.

References Cited

UNITED STATES PATENTS 1,891,160    12/1932    Jespersen    249—17 XR
2,621,389    12/1952    Von Herdenstam et al.

WILLIAM J. STEPHENSON, Primary Examiner

U.S. Cl. X.R.

249—17